| United States Patent [19] | [11] | 4,069,058 |
|---|---|---|
| Washburn | [45] | Jan. 17, 1978 |

[54] POROUS SILICON OXYNITRIDE REFRACTORY SHAPES

[75] Inventor: Malcolm E. Washburn, Princeton, Mass.

[73] Assignee: Norton Company, Worcester, Mass.

[21] Appl. No.: 740,357

[22] Filed: Nov. 10, 1976

Related U.S. Application Data

[63] Continuation-in-part of Ser. No. 599,387, July 28, 1975, abandoned.

[51] Int. Cl.² ............................................. C04B 35/58
[52] U.S. Cl. ................................... 106/55; 106/40 R; 106/44; 106/69; 106/73.5
[58] Field of Search ................ 106/40 R, 41, 55, 73.5, 106/44

[56] References Cited

U.S. PATENT DOCUMENTS

| 3,356,513 | 12/1967 | Washburn | 106/55 |
| 3,639,101 | 2/1972 | Washburn | 106/55 |
| 3,679,444 | 7/1972 | Washburn | 106/55 |
| 3,785,941 | 1/1974 | Jacobs | 106/735 |

*Primary Examiner*—J. Poer
*Attorney, Agent, or Firm*—Arthur A. Loiselle, Jr.

[57] ABSTRACT

A porous refractory body is formed by bonding $Si_2ON_2$ grain or other suitable refractory grain with fine crystals of $Si_2ON_2$ formed in situ by firing a shaped body under nitridation conditions. The body has an open pore structure, is resistant to the constituents of an aluminum chloride electrolysis cell and has good structural strength.

9 Claims, No Drawings

POROUS SILICON OXYNITRIDE REFRACTORY SHAPES

BACKGROUND OF THE INVENTION

This application is a continuation-in-part of my copending application Ser. No. 599,387, filed July 28, 1975, now abandoned.

Porous plates, tubes and other shapes have been needed by the aluminum industry to introduce gases into molten baths and metal without being attacked by the molten materials. One specific need is a porous media that will withstand chlorine or chlorinated gases at elevated temperatures to be used in an aluminum electrolysis system of the type described in Jacobs U.S. Pat. No. 3,785,594 assigned to Aluminum Company of America. The material must also resist attack by molten chloride salts and molten aluminum.

Silicon oxynitride, in a low permeability form, has been demonstrated to withstand attack by the environment found in the above Alcoa process. It has been found, however, that simply reducing the density to increase the porosity does not provide adequate permeability and results in a body with fine discrete particles that are loosely bonded rather than as a dense matrix. What is needed is a dense matrix with interconnecting pores or channels that are free to pass gas. Attempts, in the past, to produce a continuous pore network using a burnout material, upon nitridation, have resulted in either carbon filled pores or pores that are filled with a fibrous deposit of alpha silicon nitride. Permeabilities of these bodies were greatly reduced. Similarly, early attempts to produce a continuous pore network by pressing sized grains of green compacted silicon oxynitride raw mix have also resulted in pores filled with silicon nitride fibers after nitridation with subsequent reduced permeability.

PRIOR ART

While there is considerable prior art on the formation of $Si_2ON_2$ (e.g. U.S. Patents to Washburn U.S. Pat. Nos. 3,356,513, 3,639,101 and 3,679,444 as well as U.S. Pat. No. 3,193,399 for forming a $Si_2ON_2$ bond for silicon carbide grain) there is no known prior art showing the formation of a satisfactory porous $Si_2ON_2$ body. There are other porous refractory bodies such as those shown in U.S. Pat. Nos. 2,806,772, 2,691,598 and 3,175,918 but none of these show a product having the porosity and corrosion resistance of the present invention.

SUMMARY OF THE INVENTION

I have discovered a way to produce a silicon oxynitride body with a continuous pore network that has high permeability. These structures are open and do not have either a carbonaceous residue or deposits of alpha silicon nitride fibers and are essentially all silicon oxynitride. By mixing sized silicon oxynitride grain with a special bonding mix and nitriding, I have produced bodies that exhibit high permeability to gases with low pressure drops, that have a dense oxynitride matrix and an open pore network. Permeabilities can be adjusted to a desired level by adjusting the size and shape of the grain.

The use of a sized silicon oxynitride grain allows the formation of a continuous pore network without subsequent carbonaceous residues plugging the pores as might be found, for example, with an organic pore inducer. Sized grains have been made by crushing rejected low permeability silicon oxynitride refractory scraps and screening out the desired sizes. The pore size of the low permeability silicon oxynitride made in accordance to my patent U.S. Pat. No. 3,679,444, for example, is typically about 1 to 2 microns, ranging in size from 0.2 microns to 20 microns. Density of such material typically ranges from 2.0 to 2.2 g/cc. These grains can also be made by compacting an oxynitride raw batch and crushing and screening the green compacts to the desired mesh size and then nitriding the grain. The green grains made in this way may also be used directly to form a porous shape, provided a treatment is used to ensure that they do not break down during mixing with the special wet mix used to bond the grains together. Such a treatment could be, for example, a heat treatment in air to a temperature of 500° C. This latter technique results in rounded grains of silicon oxynitride. Rounded grains will result in a porous shape that has finer continuous porosity than a shape made from the aforementioned crushed grains of the same mesh size. The effect on permeability of the shape of the grain and the mesh size is shown in the examples to follow, particularly Examples VIII through XI.

The special bonding ingredients for the sized grains consist of finely divided silicon metal powder preferably mixed with ortho ammonium silicate solution. Added to this is a small amount of either calcium fluoride or magnesium fluoride or one or more of the oxide additions of the Washburn U.S. Pat. No. 3,356,513 patent. I have found that additions of these materials on the order of 2 to 6 percent of the bonding ingredients, greatly retards the formation of alpha silicon nitride fibers. Additions of these calcium and magnesium compounds can be as high as about 2 or 3% of the total weight of the grain and bonding ingredients. Oxides, or other sources of calcium and magnesium, may also be used to provide the same effect. The use of ortho ammonium silicate provides the necessary silica to allow the oxynitride formation to take place and the calcium or magnesium fluoride acts as a promoter for the oxynitride formation. The ortho ammonium silicate also results in a sticky adherent bonding mix which coats the $Si_2ON_2$ grains and bonds them together under relatively low pressure leaving open channels between the grains.

Although ortho ammonium silicate is the preferred binder, other binders such as an aqueous suspension of colloidal silica, for example "Ludox" 130M (made by DuPont) or ethyl silicate may be used.

DETAILED DESCRIPTION OF THE INVENTION

To form a permeable body, I typically take a quantity of sized silicon oxynitride grain such as through 10 on 24 mesh and mix it with about 25 percent of the bond mix. The bond mix may typically contain 32 percent of finely divided silicon which has an average particle size of 2 microns; 65 percent ortho ammonium silicate (OAS) which contains about 34 percent silica in aqueous solution; and 3 percent of finely divided magnesium fluoride powder. The resulting mixture is wet and sticky and can be rammed, tamped or pressed into the desired shape. Hand tamping with a wooden block has been found an adequate forming technique. Wax paper has been found to provide a suitable release for the pressed items.

After air drying, or oven drying in air, the wax paper may be peeled from the surfaces. The green item has good strength after drying and can be handled with ease. The items may then be nitrided in a typical silicon oxynitride firing cycle such as described in my patents U.S. Pat. Nos. 3,356,513 and 3,639,101. No organic burn-off cycle is needed since the green items are totally inorganic in nature. The resulting item is very permeable and has a strong open structure.

Examples of 6 × 6 × ⅜ inch porous plates were as follows:

EXAMPLES I – V

Five different formulations were mixed in a stainless steel bowl by hand and hand tamped with a wooden block in 6 × 6 inch waxed paper boxes.

|  | I | II | III | IV | V |
|---|---|---|---|---|---|
| 10/24 Si$_2$ON$_2$ grain | 360 g | 360 g | 360 g | 360 g | 360 g |
| 2 micron Si | 40 | 40 | 40 | 40 | 40 |
| CaF$_2$ powder | 0 | 4 | 0 | 2 | 0 |
| MgF$_2$ powder | 0 | 0 | 4 | 0 | 2 |
| OAS solution | 80 | 80 | 80 | 80 | 80 |

The plates were air dried and then removed from the boxes. They were set flat on alumina setting batts in a nitriding chamber and fired in a series of sequential steps with exothermic control to a temperature of 1420° C. The resulting plates were hard and well bonded and exhibited a "ring" when struck.

Pressure drop was measured at various flows of nitrogen at room temperature using a 4 inch round gasketed chamber connected to a calibrated flow meter and gas pressure sensor. The following pressure drops were found across the ⅜ inch thicknesses.

|  | I | II | III | IV | V |
|---|---|---|---|---|---|
| Flow (CFH) | 0 | 0 | 0 | 0 | 0 |
| Pressure (in. H$_2$O) | .007 | .007 | .008 | .008 | .008 |
| Flow (CFH per in.$^2$) | 0 | 0 | 0 | 0 | 0 |
| Pressure* (in. H$_2$O per inch thick) | 0 | 0 | 0 | 0 | 0 |
| Flow (CFH) | 3.0 | 6.2 | 6.0 | 2.5 | 11.5 |
| Pressure (in. H$_2$O) | .028 | .015 | .020 | .015 | .050 |
| Flow (CFH per in.$^2$) = F | .24 | .49 | .48 | .20 | .91 |
| Pressure* (in. H$_2$O per inch thick) = P | .030 | .010 | .018 | .010 | .060 |
| F/P | 8 | 49 | 27 | 20 | 15.2 |
| Flow (CFH) | 25.6 | 27.0 | 27.0 | 26.2 | 28.0 |
| Pressure (in. H$_2$O) | .159 | .048 | .071 | .091 | .090 |
| Flow (CFH per in.$^2$) = F | 2.03 | 2.14 | 2.14 | 2.08 | 2.22 |
| Pressure* (in. H$_2$O per inch thick) = P | .225 | .059 | .094 | .124 | .117 |
| F/P | 9 | 36.3 | 22.8 | 16.8 | 19 |

*Pressure drop after subtracting base pressure out.

These data show that pressure drops across the plates are reduced when either CaF$_2$ or MgF$_2$ are added to the bonding ingredients. The plates with 4 parts of either fluoride show lower pressures than those with 2 parts and both additions result in significantly lower pressures than the plate without such additions. This indicates that the interconnecting channels are more open when the fluorides are added.

EXAMPLE VI

A plate measuring 12 × 11 × ¾ inches was hand tamped from the following mixture:

| 10/24 Si$_2$ON$_2$ grain | 74.4 parts per 100 |
|---|---|
| 2 micron silicon | 8.3 parts per 100 |
| MgF$_2$ | 0.8 parts per 100 |
| OAS (34% SiO$_2$) | 16.5 parts per 100 |

The plate was dried and fired as in the previous examples. The plate was hard and well bonded with an open structure and no alpha silicon nitride fibers in the pores. Modulus of rupture of a 9 × 2⅛ inch bar cut from the plate was 1560 p.s.i. and the density of the bar was 1.56 g/cc.

EXAMPLE VII

A plate measuring 12 × 11 × ¾ inches was pressed from the following mixture:

| 10/24 Si$_2$ON$_2$ grain | 4.46 lbs. |
|---|---|
| 2 micron silicon | .50 lbs. |
| MgF$_2$ | .05 lbs. |
| OAS | 1.00 lbs. |

The plate was air dried overnight then dried in an oven at 80° C. It was fired as in the previous examples and then examined.

The permeability of the plate, measured by a standard porous plate test (for one inch thick plates) using 2 inches of water back pressure, was 66 scfm/ft.$^2$.

An X-ray diffraction pattern of a sample of the plate showed essentially all Si$_2$ON$_2$ with no peaks showing for alpha Si$_3$N$_4$, beta Si$_3$N$_4$, cristobalite, or silicon. A small peak for SiC was found with an estimated quantity of 2 to 5 percent. Spectrographic analysis of the metal phases showed essentially all Si with 1.2% Al, 0.2% Ca, 0.3% Fe, and 0.3% Mg.

Examination of a polished section of a sample of the plate showed a network of interconnecting channels ranging in size from about 0.2 mm to 2 mm with an average of about 1 mm. Although the channels were irregular in shape, the walls were smooth and showed no evidence of fiber formation. At points of contact between grains, bond necks were well established with smooth rounded transitions from grain to grain. The channels exhibited many reentrant angles thereby avoiding direct openings surface to surface. At a magnification of 56 × the nature of the bond between the grains showed rounding of pores and the formation of a dense layer on the walls of the pores. Holes and defects in the structure of the grains themselves were sealed off by the coating which ranged in thickness from 20 to 100 microns. The pore size of the coating was typically about 2 microns. However, the density of the coating appears to be greater than that of the starting grains, that is the relative pore volume of the coating is less than that of the starting grains.

In the foregoing examples, I have used only one size of silicon oxynitride grog and have made plates. For filtering or for flow control it is often desirable to have different pore sizes and other shapes such as tubes. The important characteristic of the pores is that there should be channel passages rather than spherical isolated pores. A continuous pore network permits low pressure drop for a given flow rate. The use of sized particles gives such channels, providing the channels are not plugged by the bond either by whisker growth or by the use of large volumes of bond.

The pore structure of these products is bimodal. There are the relatively large channel pores and the very small pores in the matrix and bond. Matrix and bond pores are substantially less than 10 microns and will average 2 microns or less. Channel pores are those between the grains, and will be less than the grain diameter, but continuous. The products made with 10/24 grain correspond to particle diameters of 1000 to 3500 microns. Pore sizes observed under the microscope in polished sections range from 200 to 2000 microns. The 2000 micron pore is probably a channel. The diameter of a channel pore will be ¼ to 1/10 that of the grain size.

In Example VI the bulk density of the product was 1.56 g/cc. Since the matrix and bond has a density of about 2.1 g/cc, 56 vol. percent of the body is silicon oxynitride, 18 vol. percent is fine pores in the matrix and 26 vol. percent is channel pores.

EXAMPLES VIII – XI

A series of silicon oxynitride porous tubes were made utilizing commercial silicon oxynitride grain of various grit sizes and shapes. The tubes of Examples VIII through XI all had a 4¼ inch O.D. and a 3 inch I.D.; the tubes of Examples VIII through X measured 18 inches in length while the tube of Example XI was 51 inches long.

A series of raw batch mixes were prepared in the same manner as those of the foregoing examples except that these had the following compositions, grain sizings, and grain shapes.

| Example | Composition Wt. % | Grain Size | Grain Shape |
|---|---|---|---|
| VIII | 78.7 grain<br>6.7 (2 μm) silicon<br>1.34 $MgF_2$<br>13.3 OAS | 10/24 | slivery |
| IX | 79.2 grain<br>6.7 (2 μm) silicon<br>0.67 $MgF_2$<br>13.4 OAS | 16/35 | slivery |
| X | 74.0 grain<br>8.3 (2 μm) silicon<br>1.0 $MgF_2$<br>16.6 OAS | 30/60 | slivery |
| XI | 74.0 grain<br>8.3 (2 μm) silicon<br>1.0 $MgF_2$<br>16.6 OAS | 20/60 | round |

The raw batch mixes were formed into tubes by isostatically pressing in the conventional manner; the green tubes were fired and nitrided as were the plates of Examples I through VII.

The porosity, or more accurately, the permeability of the fired tubes was measured by mounting one end of a tube on a gasketed steel plate; mounting the other end of the tube on a similar gasketed steel plate but this plate was fitted with a pressure gauge for measuring the pressure within the tube, and a gas inlet means for supplying the pressure. The system also contained a flow meter. Air was forced into the tube at such a rate as to build up a pressure therein of 2 inches of water for the tubes of Examples VIII through X, and a pressure of 10 inches of water in the tube of Example XI; the flow rate in each case was measured. The absolution flow rates and pressures were converted to cubic feet per hour per square inch of tube surface area, and inches of water per inch of tube wall thickness respectively. The results and F/P values were as follows:

| Example | VIII | IX | X | XI |
|---|---|---|---|---|
| Flow (CFH per in.²) | 26.2 | 13.8 | 4.5 | 5.6 |
| Pressure* (inches of $H_2O$ per inch thickness) | 3.2 | 3.2 | 3.2 | 16.0 |
| F/P | 8.2 | 4.3 | 1.4 | 0.35 |

*Pressure drop ignoring the small base pressure

As is clear from the examples the degree of permeability can be widely and accurately built into the product by the proper selection of grain size and grain shape. A tube made according to Example X exposed to a highly chlorinated environment was still operable after six months of that severe exposure. By contrast a prior art tube of aluminum oxide deteriorated to a point where it was no longer useable, after only one weeks exposure to the same environment.

Obviously, I can make the product with a range of grain sizes, pore sizes, and channel volumes. The principal limitations are (a) too low a strength for the highest porosity or (b) too little bond or (c) too low a permeability for the finest grain sizes or (d) too large a volume of bond. Experience with porous ceramic bodies in other materials indicates that 4 mesh is about as large as desired and 90 mesh will be the lower limit for this invention product. The channel diameter would range from 1000 microns to 20 microns respectively. The densest packing, with appreciable permeability, will be a product with a bulk density of 1.8 g/cc which corresponds to 64.3 vol. percent solid, 21.4 vol. percent pores in the $Si_2ON_2$ grain, and 14.3 vol. percent pores in the form of channels.

In the above examples I through X, the $Si_2ON_2$ grain was obtained from crushed $Si_2ON_2$ plates which had been prepared as described in Washburn U.S. Pat. No. 3,356,513 which results in slivery shaped grains. The rounded grains of Example XI were made by pressing plates from a green mix like that of the Washburn U.S Pat. No. 3,356,513 and drying; crushing the green pressed piece, in a muller type crushing apparatus which produced rounded green granules; and then firing said green granules according to the teachings of the same Washburn patent. The fired grains were then screened and the through 20 on 60 mesh material was collected. The silicon oxynitride grain utilized in all of the foregoing examples was made according to the general teachings of the Washburn U.S. Pat. No. 3,639,101 and therefore had the approximate composition:

| | Wt. % |
|---|---|
| silicon oxynitride | 76 |
| alpha silicon nitride | 11 |
| beta silicon nitride | 4 |

|              | Wt. % |
|---|---|
| cristobalite | 9 |

Whenever the term silicon oxynitride is used herein with reference to the grain, it is meant to include this 76% material as well as materials which may be essentially all silicon oxynitride; commercially available silicon oxynitride has the former composition of approximately 76% silicon oxynitride. The silicon was obtained from Union Carbide Corporation under the designation of technical grade. It had a nominal analysis of 98.5 Si, 0.9 Fe, 0.5 Al and 0.1 Ca; the $MgF_2$ was finely divided purified powder and the $CaF_2$ was a 200 mesh and finer "native" powder. The ortho ammonium silicate (OAS) was obtained from Philadelphia Quartz Company having the designation OAS #3 which contains 34 percent $SiO_2$ and a mole ratio of $SiO_2$/Cation of 4.5.

It should also be understood, that while commercial grade silicon oxynitride was used in the foregoing examples, other suitable refractory grains may be coated and bonded with the aforedescribed silicon oxynitride bond to form the porous, chemically resistant refractory body of the invention. Examples of such suitable grains are those composed of mullite, zircon, fired silica, silicon nitride, or the like. The materials of course must be refractory, the grains must be predominantly coated with oxynitride bond, and the porosity must be interconnecting so that the formed body is permeable.

What is claimed is:

1. A permeable refractory body consisting of a refractory grain having a mesh size of from 4 to 90, and a silicon oxynitride bond therefor, said body having a porosity, as represented by the ratio of flow rate "F" to pressure drop "P" of F/P of at least about 0.3, where F is measured in cubic feet per hour per $inch^2$, and P is measured in inches of water per inch of thickness of said body, the pores of said body being essentially free of silicon nitride whiskers.

2. The permeable refractory body of claim 1 wherein said refractory grain is selected from the group consisting of silicon oxynitride, mullite, zircon, fused silica, silicon nitride or mixtures thereof, and wherein said silicon oxynitride bond is formed from a mixture of silicon, a source of silica, and a source of a compound selected from the group consisting of calcium fluoride, mgnesium fluoride, barium oxide, calcium oxide, magnesium oxide, strontium oxide, cerium oxide, yttrium oxide, and mixtures thereof, the latter compound being present in an amount of from 0 to 3% by weight of the total refractory body.

3. The permeable refractory body of claim 2 wherein said refractory grain is silicon oxynitride and said F/P ratio is from about 0.3 to about 5.

4. A porous refractory body consisting essentially of $Si_2ON_2$, said body having a porosity, as represented by the ratio of flow rate "F" to pressure drop "P" of F/P, of greater than 6, where F is measured in cubic feet per hour per $in.^2$ and P is measured (at about 0.1 inch water pressure) in inches of water per inch of thickness, the pores of said body being essentially free of $Si_3N_4$ whiskers.

5. A permeable silicon oxynitride product having a bulk density less than 1.8 g/cc, at least 14 volume percent of the volume consisting of continuous channels of pores with pore diameters between 20 and 1000 microns.

6. The porous body of claim 5 wherein the major fraction of the $Si_2ON_2$ is the form of $Si_2ON_2$ grain having a relatively coarse particle size on the order of 10–30 mesh, said grains being bonded together by denser $Si_2ON_2$ which also coats the grains to a thickness on the order of 20–100 microns.

7. The product of claim 6 wherein said dense $Si_2ON_2$ coating is formed by in situ nitridation of colloidal silica and silicon.

8. The porous body of claim 5 wherein the major fraction of the $Si_2ON_2$ is in the form of $Si_2ON_2$ grains which are bonded together by a dense $Si_2ON_2$ layer surrounding each grain and extending between the grains at their points of contact.

9. The product of claim 4 having continuous channels with a size distribution in the range of 20 to 2000 microns.

* * * * *